Figure 1:
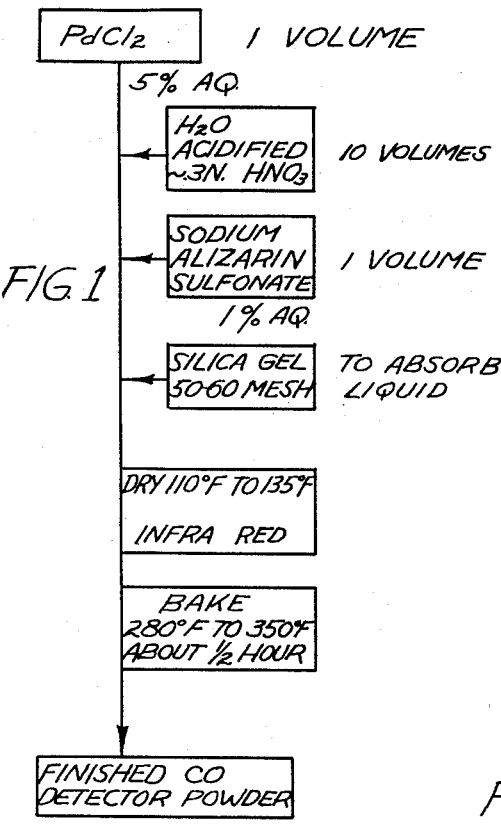

March 13, 1956 — W. C. DARBY — 2,738,257
COMPOSITION, METHOD, AND DEVICE
FOR DETECTING CARBON MONOXIDE
Filed June 14, 1954 — 2 Sheets-Sheet 1

NO. 2 NON-ACCUMULATIVE

INVENTOR.
WILLIAM C. DARBY
BY H. W. Breleford
ATTORNEY

March 13, 1956
W. C. DARBY
2,738,257
COMPOSITION, METHOD, AND DEVICE FOR DETECTING CARBON MONOXIDE
Filed June 14, 1954
2 Sheets-Sheet 2
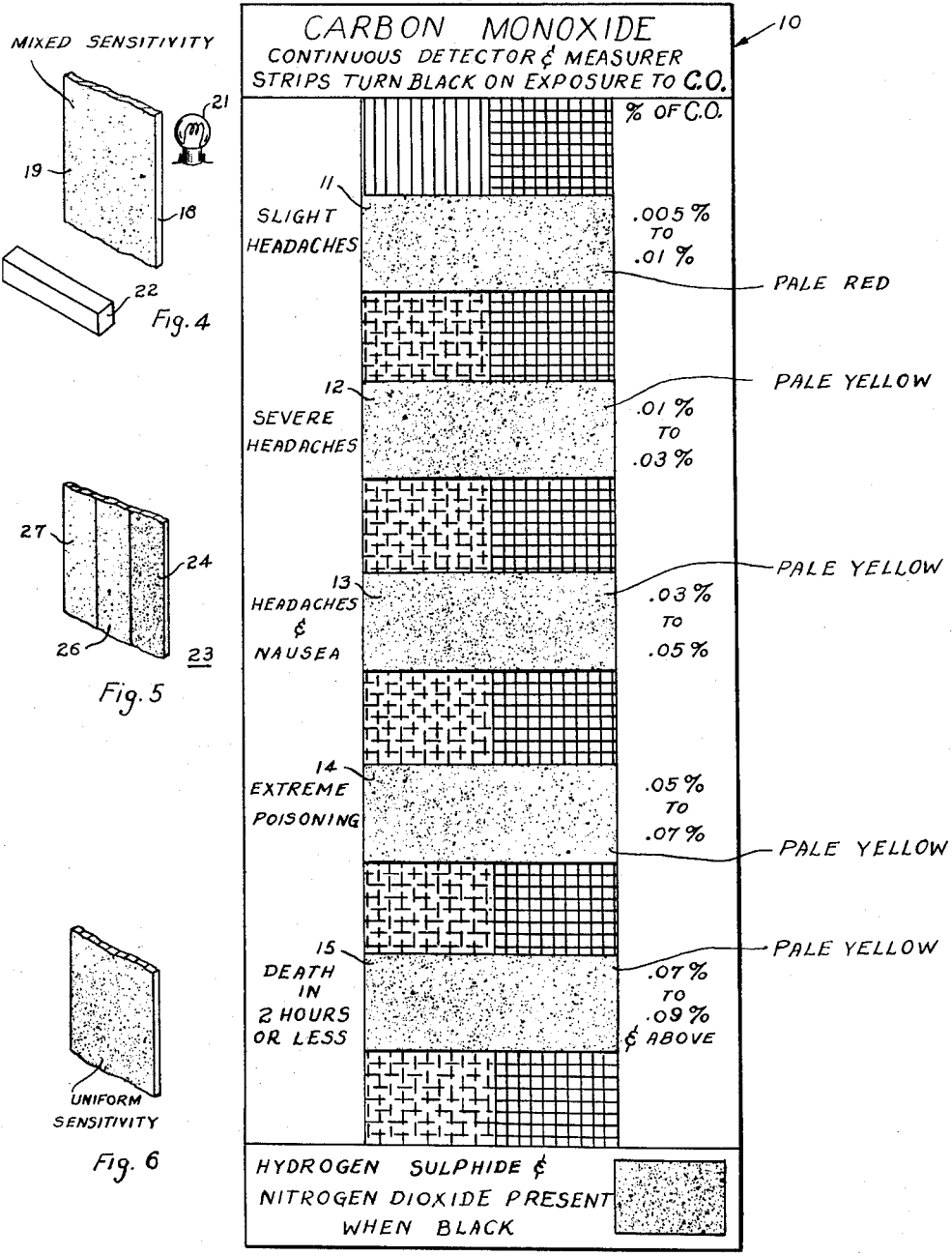
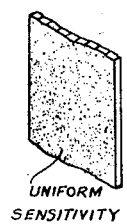
INVENTOR.
William C. Darby
BY
H. W. Brelsford
ATTORNEY United States Patent Office 2,738,257
Patented Mar. 13, 1956

2,738,257
COMPOSITION, METHOD, AND DEVICE FOR DETECTING CARBON MONOXIDE

William C. Darby, Santa Maria, Calif.; William K. Darby executor of said William C. Darby, deceased Application June 14, 1954, Serial No. 436,581

17 Claims. (Cl. 23—232)

My invention relates to carbon monoxide detection and has particular reference to a chemical substance that changes color or appearance when exposed to an atmosphere containing carbon monoxide. This application is also a continuation in part of my co-pending patent application Serial Number 148,381 filed March 8, 1950, now abandoned, and entitled Carbon Monoxide Detector.

Carbon monoxide is well known as an industrial poison gas, the presence of which must be accurately determined. Mines are particularly subject to carbon monoxide, especially coal mines. The use of internal combustion engines also gives rise to poisoning problems, not only in automobile garages and tunnels, but in the interior of operating vehicles including airplanes. Additionally, the detection of carbon monoxide has been used for combustion control in such engines.

Carbon monoxide detectors heretofore used, have been complicated to operate and time consuming. In danger zones, an instantaneous indication is desirable as serious poisoning can be encountered before the presence of this odorless, colorless and tasteless gas is determined. The slower chemical tests are unsuited for such danger zones, such as mines. A more rapid tester of recent design involves the use of a hand operated air pump which passes the suspected atmosphere through a capsule containing a color responsive substance. The color of the substance is then compared to a color chart correlated to the number of pump operations, and the final hue is used as a measure of the amount of carbon monoxide contamination present. This procedure permits two human errors, one on the number of pump operations performed and the other on visually comparing a color to a chart. Furthermore, this procedure often takes several minutes.

I have devised a chemical substance that is translucent or semi-transparent in its normal state. When exposed to carbon monoxide it becomes more opaque and finally black upon exposure to any concentrations of carbon monoxide. Furthermore, the time period required to produce this translucency or color change is on the order of several seconds. This combination of a translucent detector substance and a fast response makes possible an automatic photoelectric technique for detection. For example, a uniform and continuous blast of air may be directed against a slowly moving transparent tape having my detection substance adhered thereto. A photoelectric system can measure any change in the light transmission or reflection of the tape and thus give an instantaneous detection and measure of the carbon monoxide present in the air being sampled. Human error is completely eliminated and a rapid detection with accuracy is possible.

I have made a further refinement of my invention which refined substance I term as a "non-accumulative" detector whereas my primary substance is accumulative in character. The primary substance becomes darker and darker depending upon two factors, the time of exposure of the detector, and the concentration of the carbon monoxide. For a given concentration, darkening is dependent on time only, becoming darker and darker until it approaches complete opaqueness. My non-accumulative detector on the other hand reaches a maximum darkness for a given concentration of carbon monoxide, that may be considerably less than complete opaqueness for a selected sensitivity of detector, regardless of the time of exposure, when the material is exposed for a prescribed minimum period on the order of minutes of time. For a given concentration of carbon monoxide, the darkening of the non-accumulative substance is dependent upon time until the minimum time has been reached, and thereafter darkening is independent of time and can be affected only by a change in concentration.

This factor of non-accumulation is important in that I have been able to produce detectors of graded and predictable sensitivity. Thus five different sensitivities of detector may be provided to cover the carbon monoxide range from zero contamination of air up to .1% contamination or concentration. For example 1, from .002% to .01%; 2, from .01% to .03%; from .03% to .05%; 4, from .05% to .07% and 5, from .07% to .09%. Thus detector 1 may be completely blackened by .005% but detector 2 and the others will be little affected by this concentration regardless of the time of exposure.

In addition to providing non-accumulative material my invention also includes a still further refinement wherein the translucency of the substance may be returned to its orignal light color after exposure to carbon monoxide that has made it substantially black or opaque. That is, when the carbon monoxide concentration is removed or is lessened, the indicator will return to its original light color. This characteristic of my refined material I prefer to term regeneration. This is in contrast to the basic material which does not return to its original condition or color.

The non-accumulative detector characteristic may be combined with this regenerative quality to obtain a rather amazing product; a visually observed card that may be placed in a room or other area and give an accurate indication of the percentage of carbon monoxide contamination actually present at any period of time during a 24 hour or longer period. Such an observable indicator for current or prevailing contamination may be provided by placing several strips, for example the previously listed 5 of graduated sensitivity, of my non-accumulative substance upon a card which may be placed in a room. A carbon monoxide concentration that corresponds to the calibration for the particular strip will turn that strip and other more sensitive strips, black. After the contaminated air is replaced by purer air the most insensitive strip that has been darkened will first resume its original color and so on until the only strip that is dark corresponds to the remaining contamination and, of course, any more sensitive strips will remain dark also. Thus an observer can tell at any period of time the concentration of carbon monoxide present by merely observing stationary card.

Both my accumulative and non-accumulative substances employ chloride of palladium (or other suitable palladium halide) as a starting material. This substance has long been known as a carbon monoxide detector, undoubtedly due in part to its ability to absorb tremendous quantities of this gas which may be as high as 800 volumes. This material turns dark upon exposure to carbon monoxide and can also be combined with other materials. One prior art carbon monoxide detector, for example, makes use of the color change in molybdate ions in the presence of palladium ions. When carbon monoxide is introduced a blue color is produced. Other processes employ palladium sulphate as a starting material to obtain a color change with molybdate materials. Several of these are described by Martin Shepherd's article in volume 19, page 77 of Analytical Chemistry, February 1947. Another color change process employs palladium sulphites. Such palladium base detectors have proved unsatisfactory because concentrations have to be determined by color change, colors are "muddy," much time is required and the apparatus requires skill in use. Furthermore, a controlled water content in the indicator is required in most of these prior detectors.

I have discovered, however, that if certain dyes are properly combined with a palladium halide that a very pronounced, proportional and controllable darkening change takes place upon exposure to carbon monoxide. Thus I completely eliminate molybdates of any kind and use instead a palladium base substance which is new and not heretofore used.

My primary detection substance is a combination of a palladium compound and one of a group of indicators, including alizarin red S and ortho tolidine. Palladium may be present as a chloride in aqueous solution. The water mixture of the dye and palladium may then be applied to solid particles and I have found that this can most expeditiously be done by absorbing the water by an absorber such as silica gel. The gel particles are next dried at a low temperature and the final product is thereafter baked at an elevated temperature.

My non-accumulative detector employs a second dye, guinea green, to extend the sensitivity range, and a metal salt, chloride of copper, to affect the regeneration characteristic. These additives are also absorbed by the gel, but the final baking may take place at a higher temperature than with my primary or accumulative detector.

It is therefore a general object of my invention to provide an improved substance for detecting carbon monoxide.

Another object is to provide a palladium base carbon monoxide detector wherein a dye is combined with the palladium to give a drastic color change or darkening upon exposure.

A further object is to provide a palladium-dye detector for carbon monoxide wherein the color change is accumulative in accordance with the time and concentration of the contamination.

It is an object to provide a carbon monoxide detector wherein a darkening occurs upon exposure that is not intensified by prolonging the exposure.

A further object is to provide a carbon monoxide detector which gives a color change or darkening depending upon the prevailing contamination, and which returns to an original color when the contamination is removed.

A still further object is to provide a carbon monoxide detector substance that does not require the presence of water or other liquid to give an indication.

Still another object is to provide a visual, quantitative indicator that continuously operates throughout its life to give an instantaneous indication of quantitative carbon monoxide contamination.

Another object is to provide a tape of transparent material upon which may be placed my detector substances for use in an automatic photoelectric machine tester.

Another object is to provide a tape of transparent material having detectors of varied sensitivity thereon for use with photoelectric devices to quantitatively cover a wide range of contamination of carbon monoxide.

Other objects and advantages of my invention will be apparent in the following description and claims considered together with the accompanying drawings forming an integral part of this application and in which:

Fig. 1 is a simplified flow diagram for the manufacture for accumulative detector substance.

Figure 2:
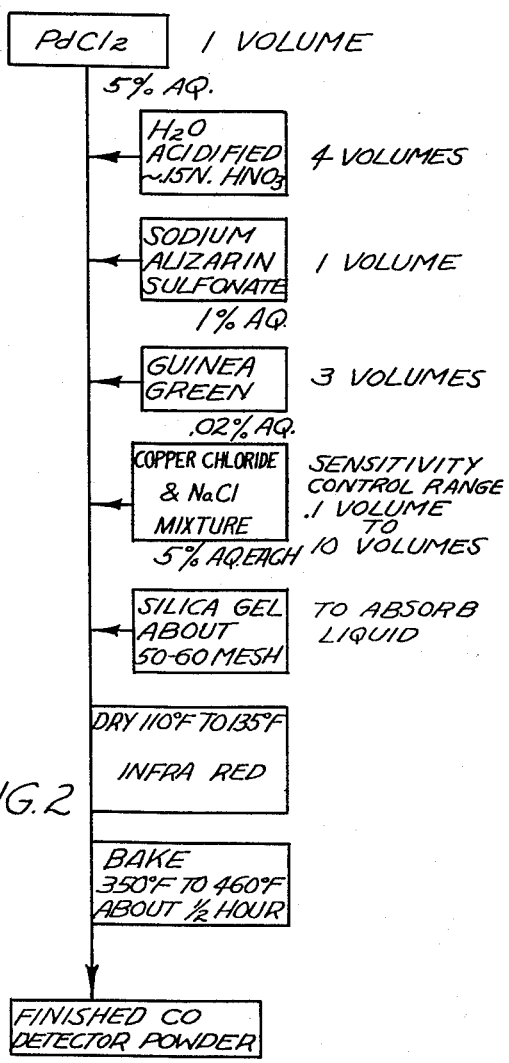
Figure 7:
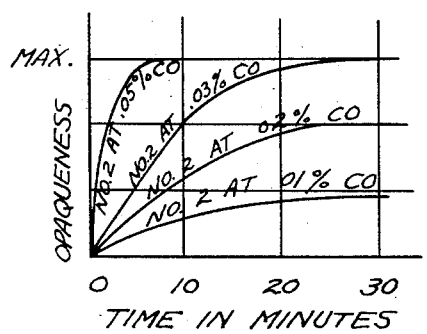

Fig. 2 is a simplified flow diagram for the manufacture of non-accumulative detector substance, Fig. 3 is a plan view of a card that gives an instanteous visual indication of quantitative atmospheric contamination, Fig. 4 is a perspective view of a translucent tape segment of mixed sensitivity, non-accumulative detector material, disposed between elements of a photo-electric circuit, Fig. 5 is a perspective view of a segment of translucent tape, Fig. 6 is a perspective view of a segment of transparent tape having my accumulative detector applied thereto, and Fig. 7 is a graph illustrating the response of a non-accumulative detector to different concentrations of carbon monoxide.

I. GENERAL DESCRIPTION

In manufacturing my detector substances I have found that purity of materials is important and accordingly I prefer to use triple distilled water and chemicals having the equivalent of pharmaceutical purity. In the following description palladious chloride will be referred to as palladium chloride even though the tetravalent palladium halides are theoretically possible.

A. *Accumulative detector*

Reference to Fig. 1 may be had for the description of my accumulative detector. To a quantity of 5% aqueous solution of palladium chloride ($PdCl_2$) there is added approximately 10 times its volume of triple distilled water acidified slightly with nitric acid, ($HNO_3$) to less than unity normality. To this is added preferably a drop at a time, a dye stuff, for example alizarin red S (sodium alizarin sulfonate) $[C_{14}H_5O_2(OH)_2SO_3NA \cdot H_2O\ 1:2:3]$ in a 1% aqueous solution of approximately the same volume as the palladium chloride. During these mixings, agitation in the form of stirring is desirable.

This dye mixture is next placed upon a carrier and I have found that this can be conveniently done by absorbing the water into the carrier. Thus fairly pure silica gel of about 50 mesh may be added to the mixture in an amount to just absorb the water, and with it the palladium dye mixture.

The gel is next subjected to a drying step which is critical in that exposure to a definite temperature range is required. The temperature of the drying gel may be in the range of 110° F. to 135° F. and the intensity of the infra red light, as best I can calculate it, is in the neighborhood of .06 watt per square inch. Stirring may be maintained during drying and when the material flows as dry granules, this step is completed.

The dried gel may then be allowed to cool if desired, although this is not essential, and may then be baked for about a half hour at about 300° F. After cooling gradually, the final powdered gel is ready for use as a carbon monoxide indicator or detector for all concentrations when used in a photoelectric machine while disposed on a transparent tape. The finished gel is pale gold in color and turns black upon prolonged exposure to carbon monoxide.

I am not certain of the chemical structure of the final product. The chloride-dye mixture does not appear to be colloidal. The odor of chlorine is noticeable upon adding the silica gel, is also noticeable during drying of the silica gel under infra red rays, and is very pronounced upon baking. I therefore presume that the final product does not include chlorine as a component. Whether or not the nitrate radical is combined with the palladium or the dye, is speculative as the nitric acid appears necessary, but presumably would be destroyed at the baking temperature of 300° F. Since I am unable to determine the resulting chemical structure that gives my highly proportional darkening effect upon exposure to carbon monoxide, I am compelled to describe it in terms of the material components and/or the process by which it is formed.

Nor do I know the exact nature of the darkening action when my detector is exposed to carbon monoxide. I do not believe that the palladium is present in its free metallic state, but do believe that it forms some complex compound with the alizarin reds which is assisted or brought about by the presence of the acid. The fact that the darkening can be removed in my regenerative detector shows that the action is probably reversible and is not a simple oxidation action. The fact that moisture is eliminated in the baking step would seem to preclude ionic changes upon exposure to carbon monoxide. I presume, however, that the palladium absorbs the carbon monoxide and this in turn acts upon the final compound. Because of the fact that I do not know the nature of the reaction, I must describe it in terms of composition, process and function.

B. Non-accumulative detector

My non-accumulative detector substance is ordinarily compounded so as to be regenerative as well as non-accumulative. Further, I can compound it so that it may have a large variety of sensitivities that are predictable and reproducible in manufacture. The process for making my non-accumulative detector is substantially the same as with the accumulative except that closer controls are needed, and a second dye, guinea green is added, and there is also added chloride of copper as a reversal or regeneration material. Reference to Fig. 2 may be had for the description of my non-accumulative detector.

To one volume of aqueous 5% palladium chloride ($PdCl_2$) solution there may be added 4 volumes of distilled water acidified to about .15 normal with nitric acid. About one volume of aqueous 1% of alizarin red S solution is next added and thereafter about 3 volumes of aqueous .02% solution of guinea green ($C_{37}H_{35}N_2O_6S_2Na$). The reversal agent cuprous or cupric chloride is next added. This is preferably in a 5% aqueous solution to which 5% sodium chloride has also been added to assist solution of the copper chloride. The volumes may vary from .1 to 10 and for example about 2.34 volumes. Silica gel is next added in an amount to absorb the liquid. I am not certain whether guinea green is the same as guinea green B as they seem to be treated the same in chemical literature.

The drying step is more critical with the non-accumulative detector than the accumulative, but may take place in the same temperature range of 110° F. to 135° F. The visible light may have an intensity of about 900 foot candles and the infra red may have an intensity of about .06 watt per square inch. The dried powder is then baked in a temperature range from 400° F. to 425° F. for about a half hour, and after cooling is ready for use. This detector is non-accumulative, regenerative, pale yellow in color and turns black upon exposure to .05% carbon monoxide.

C. Regenerative detectors

While I prefer to make my non-accumulative gels regenerative as just described, it is possible to make the non-accumulative detector so that it does not regenerate. That is, when it turns black and the concentration of carbon monoxide is reduced, the detector nevertheless stays black. This non-accumulative, non-regenerative gel is made by using small proportions of copper chloride solution.

The copper chloride gives rise to the regenerative action and I have found that sodium chloride or similar salt not only helps to dissolve the cuprous chloride by the "common ion" technique but apparently aids the regenerative action.

D. Theory of regeneration

While I cannot prove this theory, it is my belief from observed phenomena that the operation upon regeneration is as follows: The copper absorbs carbon monoxide, but unlike palladium tends to maintain the original light color of the detector upon absorption. Thus the palladium and copper oppose each other as to the darkening of the detector and this accounts for the slower time response of the non-accumulative, regenerative gels or detectors. By properly proportioning the palladium to the copper, any desired equilibrium of opposition can be set up, and on very insensitive detectors the two are nearly equal in equilibrium. In very sensitive detectors the palladium is predominant.

When the concentration of carbon monoxide is reduced below the percentage that will darken the selected sensitivity of detector, the palladium gives up its carbon monoxide faster than the copper. Then the tendency of the copper to lighten the color is more pronounced than the palladium to darken and after a few minutes the copper returns the detector to its original pale yellow color.

II. DETAILED DESCRIPTION

A. Accumulative gel

Since silica gel is a preferred carrier, I will refer to my detector substances hereinafter as gels. Also to make the description briefer, the gas carbon monoxide will be referred to by its chemical symbol CO.

The following is a detailed description of my standard accumulative gel as made up in laboratory batches:

The palladium chloride may be obtained in commercial form in 5% aqueous solution. Add 17 minims (a unit of measure of about a drop) of this palladium chloride solution to 100 minims of triple distilled water acidified to about .3 N by adding 3 minims of nitric acid (Merk. N.F. mol. weight 63.02). Stir thoroughly. After adding an additional 50 minims of distilled water there is added 8.5 minims of 1% solution of alizarin red S (sodium alizarin sulfonate) drop by drop stirring constantly. Next 133 grains of silica gel may be added to this liquid and may be about 50 to 60 mesh.

The gel will absorb the liquid and with it the chemicals in solution and may be placed in an evaporating dish to dry between 110° F. and 120° F. Irradiation with infra red improves the product and accordingly a heat lamp with an incandescent filament may be employed as the source of infra red rays, giving the required heat. A G. E. reflector infrared industrial 250 watt lamp placed 12″ to 17″ from the gel gives satisfactory results. The drying gel may be stirred until it is a dry powder.

The dried gel may be cooled for about an hour as this resting appears to improve its uniformity. It may next be heated in an electric oven for about half an hour at about 300° F. Thirty minutes at 300° F. is a satisfactory baking procedure and the preferred range is from 300° F. to 325° F. The minimum satisfactory temperature is 280° F. and below this there is a loss in sensitivity. The upper limit is 350° F. and above this the color is too dark to bring out a change in color. The baked gel may next be removed from the oven and allowed to cool in clean air to room temperature, 70° F. The cooled granular gel may be placed in airtight containers, and while it is immediately ready for use, it should be allowed to age for 1 to 2 days to obtain uniformity and predictability in its response.

If the detector powder is to be used in a photo-electric machine it may be applied to a transparent cellulose tape having adhesive applied thereto. Tape ¾″ wide sold under the name of Texcel tape by Industrial Tape Company has been found satisfactory. The granules or powder may be sprinkled uniformly and densely on the adhesive surface and then rolled or pressed firmly in place. The tape may then be brushed lightly. The finished tape may be exposed to ambient air, but preferably a uniform air blast is directed against it. The tape will measurably darken in a matter of seconds to an air current containing .001% CO as indicated by a photoelectric meter circuit. Light to energize the phototube may either pass through the tape or may be reflected from the granular surface. Such a tape is illustrated in Fig. 6.

The silica gel employed should be quite pure and I have found that that supplied by Davison Chemical Company, 50–60 mesh PA 100 is satisfactory. This gel is whitish clear in color and substantially translucent even in granular form. When it absorbs the liquid mixture it becomes a pale yellow. It remains this color after being removed from the baking oven. When applied to a tape the darkening effect of CO changes the translucency of the granules and hence the tape as a whole. The final color is black upon prolonged exposure to CO and the tape becomes opaque to a light that is strong enough to measure the original darkening mentioned. The immediate visual color changes are to a brownish tinge darker gold upon exposure to .01% CO; stronger brownish tinge with .015% CO; .02% CO gives a distinct brown color, and thereafter a purplish black color appears.

This accumulative gel is fairly insensitive to other gases. Heavy hydrogen sulphide has a pronounced effect and the tape thereafter will not detect .01% CO. Formaldehyde vapor and steam vapor have no effect, and the tape will thereafter react to CO going ultimately black.

*Variables.*—The relative proportions of palladium chloride, and alizarin red S may be varied from 1 to 1 given in the general description to 4 to 1 by volume without destroying the qualitative reaction, although there is a distinct loss in sensitivity at the high end of this range. Increases in the relative amounts of alizarin red S do not have much effect. The normality of the nitric acid may vary from .1 N to 2.0 N for the given 10 volumes of acidified water. The water may be varied from 1 to 10 volumes compared to the palladium chloride solutions as unity. Other halides of palladium should operate effectively since all are slightly soluble in either water or weak acid. Thus palladium bromide and palladium iodide may be satisfactory. Very few other dyes may be employed in place of alizarin red S, and ortho tolidine hereafter described is one of the few that is workable. The temperataure range for the drying step is 110° F. to 135° F. Below that range the material becomes insensitive, and above that range it turns black. The baking temperature range is 280° F. to 350° F. Below that range sensitivity loss occurs and above that range the gel goes black.

*Ortho tolidine.*—I have found that ortho tolidine [$NH_2(CH_3)C_6H_3$]$_2$ may be substituted for alizarin red S in my primary gel or detector. While ortho tolidine is not in itself a dye it is an important starting material upon which dyes are formed and this fact may account for the similarity in reaction between the two substances. While slightly soluble in water ortho tolidine is readily soluble in acid. Accordingly 1 grain of ortho tolidine powder may be dissolved in 20 minims of 10% hydrochloric acid and diluted with 100 minims of distilled water. There may be substituted 5 minims of this solution in place of the 8.5 minims of alizarin red S solution. The useful range of ortho tolidine is 3 to 7 minims.

In summarizing the ortho tolidine, for approximately 2 volumes of 5% palladium chloride solution there may be used from ½ to 1 volume of ortho tolidine. The opaqueness is poorer however upon exposure, not reaching such a dark shade, and being less sensitive. The processing is the same as with alizarin red S. The color is brick red prior to drying the gel and becomes lighter in color upon drying. After heating in the electric oven it remains a light red with a purplish tinge. Ortho tolidine is not quite as satisfactory as alizarin red S which I prefer.

B. *Non-accumulative gel*

The following descriptions are for non-accumulative, regenerative gels of selected sensitivity with the exception of No. 1 which is non-regenerative. They are designed to become black upon the following concentrations of CO; No. 1, from .002% to .01%; No. 2, from .01% to .03%; No. 3, from .03% to .05%; No. 4, from .05% to .07%; and No. 5, from .07% to .09%. The processing is the same in each case and for this reason only No. 1 processing will be described in detail.

*No. 1 gel.*—To one volume of 5% aqueous solution of palladium chloride ($PdCl_2$) there is added 4 volumes of .15 normal nitric acid, and to this is added one volume of 1% aqueous solution of sodium alizarin sulfonate (alizarin red S). Next 2.7 volumes of guinea green .02% aqueous solution are added and thereafter 1 volume of a 5% cuprous chloride aqueous solution is added.

Silica gel preferably of 50–60 mesh in an amount to absorb all liquid is next added. After absorption of the mixture the gel is dried at a temperature in the range of 100° F. to 135° F. For example a 250 watt clear glass infra red lamp spaced 12″ to 17″ above the gel is satisfactory. After resting for about an hour the material is baked at a temperature in the range of 400° F. to 425° F. for about a half hour. After ageing for several days the material is ready for use.

The exact measurements employed in one laboratory example are as follows: Eight grains of .745 N nitric acid were added to 40 grains of distilled water to make 48 grains of .15 N nitric acid. Twelve grains of 5% $PdCl_2$ solution was added along with 12 grains of 1% sodium alizarin sulfonate solution. Next 32 grains of guinea green .02% solution were added along with 12 grains of 5% cuprous chloride aqueous solution. To this was added 100 grains of silica gel. This chloride solution was heated to obtain the dissolution but was cooled to room temperature before use. All materials added were at room temperatures.

This No. 1 gel is non-accumulative but will not regenerate. This affords a permanent indication of CO which may be desirable as a warming medium. Also it is difficult to produce a regenerative gel of this sensitivity. It should be noted that no sodium chloride was mixed with the cuprous chloride.

It should be noted that the baking temperature for the non-accumulative gels is higher than for the accumulative.

*No. 2 gel.*—The following proportions make a non-accumulative gel that will turn different degrees of black to CO concentrations in the range .01% to .03% (1 part in 10,000 to 3 parts in 10,000) and is not affected by lower concentrations regardless of the time of exposure. These are 4 volumes of .15 N nitric acid, 1 volume 5% palladium chloride solution, 1 volume sodium alizarin sulfonate 1% solution, 2.7 volumes of guinea green .02% solution, and 1.2 volumes of a mixture of 5% cuprous chloride solution and 10% sodium chloride solution.

The exact measurements employed in one laboratory batch manufactured was:

To 48 grains of a .15 normal nitric acid was added 12 grains of alizarin red S 1% solution, plus 12 grains of palladium chloride 5% solution, as well as 32 grains of guinea green .02% solution, and 15 grains of cuprous chloride 5% solution mixed with 10% sodium chloride. This mixed solution of cuprous chloride and sodium chloride was heated to obtain solubility of the materials and was then allowed to cool to room temperature before being added to the prior substances. Silica gel of 110 grains of 50–60 mesh were then added.

It should be noted that in No. 1 the cuprous chloride added was a simple solution whereas in No. 2 it was mixed with sodium chloride. This latter salt assists solubility of the copper chloride and additionally seems to enhance the regenerative quality as well as lightening the color from red to a yellowish hue. Here also heating is involved and the solution must be cooled to room temperature to obtain good results.

*No. 3 gel.*—The following proportions form a non-accumulative regenerative gel that will darken on .05% CO after a minimum of exposure of about 25 minutes and will not be darkened by a lesser concentration. To 4 volumes of .15 normal nitric acid there is added 1 volume of palladium chloride of 5% solution, plus 1 volume of sodium alizarin sulfonate 1% solution, plus 2.7 volumes of guinea green .02% solution, plus 2.3 volumes of 5% cuprous chloride mixed with 5% sodium chloride solution.

Exact laboratory batch measurements were 48 grains of a .15 normal nitric acid, plus 12 grains of palladium chloride 5% solution, plus 12 grains of sodium alizarin sulfonate 1% solution, plus 32 grains of guinea green .02% solution, plus 28 grains of 5% cuprous chloride mixed with 5% sodium chloride solution, and 130 grains of 50–60 mesh silica gel.

*No. 4 gel.*—The following proportions may be mixed to obtain a gel that will blacken on .07% CO (7 parts CO to 10,000 parts of air), and will not darken on lesser concentrations regardless of the time of exposure. To 4 volumes of a .15 normal nitric acid may be added 1 volume of palladium chloride 5% solution, plus 1 volume of sodium alizarin sulfonate 1% solution, plus 2.67 volumes of guinea green .02 solution, plus 3.8 volumes of 5% cuprous chloride mixed with 5% sodium chloride solution. Silica gel of 50–60 mesh may be added in quantity of about 12 volumes or enough to absorb the liquid.

Exact laboratory measurements of an experimental batch are as follows: 48 grains of a .15 normal nitric acid to which was added 12 grains of palladium chloride solution, plus 32 grains of guinea green .02% solution plus 46 grains of cuprous chloride 5% solution mixed with sodium chloride 5% solution, plus 140 grains of silica gel.

*No. 5 gel.*—The following proportions will give a gel that will be black on .09% carbon monoxide in air but will not be affected by lower concentrations: To 4 volumes of .15 normal nitric acid may be added 1 volume of palladium chloride 5% solution, plus 1 volume of sodium alizarin sulfonate 1% solution, plus 2.7 volumes of guinea green .02% solution, plus 5.2 volumes of 5% cuprous chloride 5% solution mixed with sodium chloride 5% solution.

Exact measurements of one laboratory batch are as follows: 48 grains of .15 normal nitric acid; 12 grains of palladium chloride 5% solution; 12 grains of sodium alizarin sulfonate 1% solution; 32 grains guinea green .02% solution; 62 grains of 5% cuprous chloride mixed with 5% sodium chloride solution; and 140 grains of silica gel.

*Relations of palladium and copper.*—In the most sensitive gel No. 1, palladium and copper are in the ratio of 1 to 1, both being 5% solution. In No. 2, the ratio is 4 Pd and 5 Cu. In No. 3 1 Pd is used to 2.3 Cu. In No. 4 the ratio is 1 to 3.8 and in No. 5 it is 1 Pd to 5.2 Cu. Thus it is apparent that in the most sensitive gels palladium is predominant and in the more insensitive gels larger proportions of copper are employed. As stated previously, the copper is the regenerative agent and apparently combats the tendency of palladium to darken the gel and thus gives rise to the non-accumulation characteristic as well as the regeneration.

*Effect of guinea green.*—Guinea green extends both ends of the sensitivity scale for non-accumulative gels. Its proportion to palladium may remain constant if desired in all the gels although its effect is reduced in the middle of the range.

*Non-accumulation characteristic.*—The non-accumulation characteristic can best be explained and distinguished from regeneration by reference to Fig. 7. For purposes of illustration, the No. 2 gel has been graphed in its time response versus opaqueness. This gel is calibrated in the .01% to .03% CO concentration and concentrations lower than this will have no noticeable darkening effect.

The time response of the gel to .01% CO is illustrated and it will be noted that the maximum opaqueness or darkness obtainable is a small fraction of the maximum obtainable darkening or opaqueness. No matter how long it is exposed to this concentration of CO, it will not darken further. The darkening in response to the mid range concentration of .02% CO is more rapid but is still considerably less than total darkness and the greatest possible darkening occurs in about the same length of time of 25 minutes. The maximum concentration turns the gel completely black but the darkening is at a faster rate. The higher concentrations will not make the gel any blacker but the maximum blackness will be achieved in much shorter time.

The regeneration of the original color in gels darkened less than the maximum occurs in from 1 to 5 minutes. When total blackening is produced by the maximum calibrated percentage, regeneration takes place in about 5 minutes. However, for greater concentrations of CO the regeneration may take up to 5 hours for extremely heavy percentages to a half hour for slightly higher concentrations than calibrated.

If the non-accumulative gel does not return to its original color, it is non-regenerative as is the case with No. 1. In this event the gel will have a darkness depending upon the concentration within the calibration, and will be totally black for CO concentrations of the highest rating, and all concentrations above this.

*Variables.*—The palladium chloride is the most important constituent of my non-accumulative gels or detectors from the standpoint of permissible quantitative variations. If too much palladium chloride is used there is an increase in sensitivity but the gels blacken upon baking. Therefore the quantity of palladium chloride will be referred to as the standard with respect to which the other constituents may be varied.

The nitric acid may be varied .1 N to 2.0 N when the quantity of acidified water approximates 4 times the volume of palladium chloride solution. If no nitric acid is used, the gels sometimes do not have a uniform color. However, acid is not necessary to produce gels of acceptable commercial quality. Acid in excess of 2 N throws off the regenerative equilibrium. The preferred acidity of .15 normal gives the most workable equilibrium with various concentrations of CO.

The amount of sodium alizarin sulfonate is not critical. If less than 1 volume of 1% solution is used to 1 volume of palladium chloride solution, the reaction to CO takes place but is not as uniform. Amounts of this dye above 1 volume do not appreciably change the final product. The practical range of variation to 1 volume of palladium chloride is about .8 volume to 2 volumes.

The guinea green dye solution is so weak that great variations in its volume can be made with little or no appreciable change in the product. One volume gives a gel which is orange in color whereas 5 volumes give a gel which is darker and more greenish in color. All gels within this range react similarly and efficiently.

The most critical component from the standpoint of sensitivity is the mixture of cuprous chloride and sodium chloride. If less than one-tenth volume of this mixture is used the gel is accumulative and non-regenerative. One-tenth volume gives a non-accumulative, non-regenerative gel, similar to the No. 1 gel. Between .1 and 10 volumes is the sensitivity range as indicated in Fig. 2. Above 10 volumes there is little change in sensitivity.

Considering now the baking temperature, the practical range is 400° F. to 425° F. Operable gels can be produced in the range from 350° F. to 460° F. Below this range the gels do not have the desired sensitivity and above 460° F. they do not have the non-accumulative action.

III. INDICATOR CARD

Illustrated in Fig. 3 is a card that employs the five sensitivities of gels just described. This card may be suspended in a room or disposed upon a wall and will continuously indicate the actual amount of CO contamination present. The strips of detector turn dark in about 25 minutes to the calibrated concentration and the life of the card is 1 to 2 days. The strips turn dark in 1 to 5 minutes on concentration in excess of their calibrated concentration.

This card employs the non-accumulative and regenerative gels (except No. 1) which darken when exposed to a calibrated concentration, and upon reduction of the concentration will return to the original light color. This cycle may take place as many times as desired during the life of the card.

Referring to the drawing a card 10 may have a series of strips 11, 12, 13, 14 and 15 applied thereto of a number corresponding to the desired number of sensitivities to be used. These may have granules thereon of a composition corresponding to Nos. 1, 2, 3, 4 and 5 respectively of the detailed description. These strips may be disposed at holes punched in the card and a tape may cover the holes and granules applied to the adhesive side of the tape. The ranges of CO that will turn the card black are indicated to the right of each strip and the corresponding symptoms or results are indicated on the left of the strip. Hydrogen sulphide (and nitrogen dioxide) will turn these non-accumulative strips brown and for this purpose a special detector strip 17 may be added to the bottom with an appropriate notation so that an observer will know when darkening is due to hydrogen sulphide or nitrogen dioxide assuming that he is not otherwise apprised of the presence of these gases.

Acetylene, sulphur dioxide, sulphur trioxide and chlorine produce color changes in my CO detector but do not kill the action as do hydrogen sulphide and nitrogen dioxide. The following gases have no effect: hydrogen, gasoline fumes, nitrous monoxide, steam, carbon dioxide, formaldehyde vapor, oxygen, nitrogen tetroxide, nitrogen peroxide and natural gas.

This foreign gas detector may be made by dissolving five grams of ammonium molybdate in 100 cc. of water and when dissolved 10 grams of methyl orange 1% solution may be added. Enough silica gel to absorb the liquid may be added and the gel dried under heat lamps in the range from 110° F. to 135° F. until dry. The finished gel is pale orange in color. Carbon monoxide does not affect this gel, but hydrogen sulphide and nitrogen dioxide turn the gel black, acetylene turns it to a brownish color, sulphide dioxide and trioxide turn it purple and chlorine turns it green.

In operation, the card of Fig. 3 is hung in a room and merely observed by the occupants. The time response for the indicated concentration is about 25 minutes but more sensitive strips will turn black more quickly. Thus if .05% is introduced into the room, strips 11 and 12 will turn black in 2 to 10 minutes respectively but strip 13 will turn black only after 25 minutes. If the concentration is reduced to .01%, strip 13 will resume its pale yellow color in about 5 minutes, strip 12 in about 5 hours, and only strip 11, the non-regenerative strip, will remain black. Thus over any period of time on the order of tens of minutes the maximum of ambient or current contamination will not only be indicated, but measured quite accurately. After 5 hours, any decrease in contamination below the maximum, will be indicated on all regenerative strips.

Such cards are most useful in garages, offices near combustion engines, cabs of trucks, interiors of airplanes. In instances where pockets of gas are encountered, a more rapid detector is advisable.

IV. NON-ACCUMULATIVE TAPE

My non-accumulative detector substance may be successfully employed on photoelectric devices and still cover a large range of contamination. This would seem to be contrary to the characteristic of my non-accumulative tape to darken only when exposed to its calibrated or greater concentration. However, I have discovered that I can place two or more sensitivities of gels upon a tape and accurately measure the prevailing contamination. The gels may be mixed granules of different sensitivities, or the tape may be provided with discrete stripes of different sensitivity. The tapes may operate a photoelectric device by reflection of light, or where the tape is transparent, the light may pass through the tape.

Illustrated in Fig. 4 is a length of transparent tape 18 having gel granules 19 adhered to one surface. These granules may be non-accumulative gels of mixed sensitivity; for example No. 1, No. 3 and No. 5. A light source 21 may pass light through the tape and the gel granules to a photoelectric device 22 having a window width similar to that of the tape. Upon exposure to CO, the most sensitive gels will turn black quickly, changing the light conductivity of the tape to give a photoelectric response change, for example, as measured on a microammeter. After 25 minutes the gel corresponding to the ambient contamination will be darkened, giving the true or long term reading.

Illustrated in Fig. 5 is a tape 23 wherein discrete bands 24, 25 and 27 of different sensitivity are provided. When used with a photoelectric device having a window width similar to the tape width, the response of the different bands will affect the photoelectric response because the total light transmitted is changed upon exposure to CO. Thus the control is one by means of opaqueness of a given area of the tape which affects a corresponding area of the responsive surface of the photoelectric surface as limited by the window of the photoelectric device.

In operation, the devices of Figs. 4 and 5 respond in a matter of 1 to 5 minutes to concentrations that are greatly in excess of the calibration of the most sensitive gel applied to the surface. The darkening of the gel will affect light transmission or light reflection from the surface, changing the response of the photoelectric device and its circuit. After about 25 minutes of exposure, the maximum darkening will occur as this is the time period of the gels when the contamination corresponds to calibration of the sensitivity. Decreases in CO concentration will be reflected in 5 to 10 minutes by the most insensitive gel that has been darkened, but will not be reflected for 5 or 6 hours by the more sensitive gels that have been darkened, inasmuch as this is the regeneration time for excessively blackened gels. For this reason it is desirable to have the tapes of Figs. 4 and 5 moving slowly past the light and the photoelectric device so that a fresh length thereof can be exposed to the ambient CO.

V. SILICA GEL DESCRIPTION

A. *General*

The silica gel which I employ seems to be important as a carrier of my chemical mixture. Various other carriers have been tried with poor results including pumice granules, ground asbestos, ground glass, glass wool, and ground glass wool. When the chemicals were deposited on glass plates they turned black on heating. It therefore appears that an absorbent carrier is needed to produce the detector substance.

However, I have crushed large granules of silica gel into smaller granules, but these fractured granules have not given satisfactory results. Either the porous structure of the gel was damaged during crushing, or the natural structure, crystalline or otherwise, is ruptured or destroyed, or some other factor enters in. While I have not tested all types of absorbent materials, my tests so far indicate that silica gel has specific characteristics that are important.

I have exposed my full processed detector gels to steam vapor for periods from 5 to 15 minutes and find that weight increases are on the order of 1 to 2%. Thus the outstanding absorbent action of plain silica gel for moisture is eliminated which may be due to the glazing action on the surface by a metal acid as noted by some authorities. I have microscopically examined gels in various stages of reaction and find that the reaction is principally a surface action. A fully exposed and blackened granule split in two shows only a surface darkening. Further exposure of a split granule shows a reaction only on the original surface. Apparently the reactive chemicals do not penetrate the gel granules although the dye and water do penetrate. It may be that CO is absorbed throughout the granule but this does not seem likely in view of weight change upon regeneration.

The weight changes of the detector gel when exposed to CO are most pronounced. A non-accumulative gel that weighed 30 grains before exposure weighed 38 grains after exposure and complete darkening, a 27% increase. After the gel was allowed to regenerate for a selected period, it weighed 34 grains, indicating that CO was actually thrown off. This also indicates that there is no chemical breakdown of non-accumulative gels in view of the ability to throw off CO. This would also indicate that the palladium compound is the active CO absorbent since silica gel does not throw off an absorbed gas unless heated. The size of the silica gel granules is not too important. I have successfully used 20 mesh granules, but at present prefer 50–60 mesh as giving the best response. The gel as received from the manufacturer has granules of many sizes, apparently the sizes just as they are manufactured. I sift from this mixture the desired granule size, and as I stated previously, large granules cannot be crushed to smaller ones. Likewise any fine granules or powder that is the result of chipping or splitting larger granules is not satisfactory.

B. *Heat processing*

The gel drying step in the 110° F. to 135° F. range appears to be necessary as contrasted to a single baking step. Also the baking step appears to be necessarily separate and apart from the drying step.

In the drying step in the accumulative gel processing, the presence of short wave length infra red rays is not strictly necessary for an operative gel, but in practice a better gel can be made with a heat lamp. It should be recognized that heat of any type in the 110° F. to 135° F. is long wave length infra red.

Filament type heat lamps produce most of their energy in the 12,000 angstrom range with very little energy in wave lengths longer than 25,000 angstrom units. Also a large part of the energy of these lamps is in the visible light range, which is eliminated when red glass is used but which is transmitted when clear glass is used in the lamps. The data supplied by the manufacturer indicates .08 watt per square inch of infra red energy on a surface when a 250 watt G. E. Industrial Infrared Lamp is placed 14 inches above the surface. For this reason I have used the approximate figure of .06 as approximately the energy required for processing non-accumulative gels at 17 inches and I can use spacings of this lamp from 12 inches to 17 inches from the surface.

The use of infra red lamps appears to be desirable to the drying step of my non-accumulative gels and the use of visible light in addition seems desirable.

If the gels, accumulative and non-accumulative, are dried at a temperature above 135° F. they turn a dark purple color and hence cannot be used. If temperature below 110° is used the gel is insensitive. If the dried gels are not subsequently baked, they are unpractically insensitive.

Having now described my invention in the light of my present knowledge of it, and having made all tests that are reasonably possible to determine limits, ranges and critical aspects, I now claim it as follows hereafter.

It undoubtedly will be possible to make various modifications that I have not described by the exercise of experiment starting from my present teaching. For example, ammonium chloride may well be a substitute for sodium chloride. Accordingly, I do not limit my invention to the precise disclosure nor otherwise, but claim herein all modifications as fall within the true spirit and scope of my invention.

I claim:

1. A carbon monoxide detector substance resulting from palladium chloride and sodium alizarin sulfonate deposited upon the surface of an absorbent inorganic carrier from an aqueous solution mixture and baked thereon.

2. A detector that darkens in an accumulative fashion upon exposure to carbon monoxide and formed from an aqueous solution mixture of palladium chloride and sodium alizarin sulfonate absorbed by an inorganic carrier to become deposited thereon and dried and baked upon the carrier.

3. A carbon monoxide detector comprising approximately equal volumes of about 5% palladium chloride and 1% sodium alizarin sulfonate in aqueous solutions mixed with 1 to 10 volumes of water and deposited upon the surface of silica gel granules and dried thereon from about 110° F. to 135° F. and thereafter baked for about half an hour from about 280° F. to 350° F.

4. A detector which darkens in non-accumulative fashion when exposed to carbon monoxide and having the mixture product of palladium chloride, sodium alizarin sulfonate, guinea green dye and copper chloride deposited from an aqueous solution upon the surface of an absorbent inorganic carrier and dried thereon at a low temperature and baked at an elevated temperature and which is light in color, said constitutents being about 5%, 1%, .02% and 5% respectively in aqueous solution, and approximately one volume, three volumes, and one-tenth to ten volumes respectively.

5. A detector which is self regenerative as well as non-accumulative and is the same as that of claim 4 but with the addition of sodium chloride as an ingredient.

6. A non-accumulative and self regenerative detector for carbon monoxide gas which detector can have a wide range of specific darkening reactions to specific concentrations of carbon monoxide comprising: palladium chloride solution, sodium alizarin sulfonate solution, guinea green solution mixed together with water and to which is added one-tenth to ten volumes of both 5% copper chloride solution and the same order of percentage of sodium chloride solution mixed, compared to the palladium chloride in a 5% aqueous solution as a unit volume, all as absorbed by an inorganic carrier and dried and baked on the carrier; and identified by a pale yellow color, a darkening independent of time of exposure to carbon monoxide, a self-regeneration of the original color when carbon monoxide is removed, and by turning black upon exposure to hydrogen sulphide.

7. A gel which darkens to indicate the presence of carbon monoxide comprising: palladium chloride and ortho tolidine deposited upon the surface of an absorbent inorganic carrier from an aqueous solution mixture and dried and baked on the carrier.

8. An accumulative gel for detecting carbon monoxide comprising: one volume of palladium chloride 5% aqueous solution; one-fourth to one volume of 1% sodium alizarin sulfonate aqueous solution; several volumes of water, all as deposited upon the surface of silica gel granules in an amount to absorb the liquid and thereafter dried in the range from 110° F. to 135° F. and thereafter baked in the range of 280° F. to 350° F.

9. A non-accumulative gel for detecting carbon monoxide comprising: one volume of palladium chloride 5% solution; one to four volumes of water acidified in the range .1 N to 2.0 N with $HNO_3$; .8 volume to 2 volumes of 1% sodium alizarin sulfonate solution; one to five volumes of .02% guinea green solution; one-tenth to ten volumes of 5% copper chloride in the same order of percentage; all as deposited by absorption upon the surface of silica gel granules in an amount to absorb the liquid and thereafter dried from 110° F. to 135° F., and baked for about half an hour from 350° F. to 460° F.

10. The method of multiplying the darkening effect of palladium compounds upon exposure to carbon monoxide comprising: mixing an indicator from the group consisting of sodium alizarin sulfonate and ortho tolidine with an aqueous solution of palladium salt; absorbing the mixed solution on the surface of an inorganic carrier, drying the carrier from 110° F. to 135° F. and thereafter baking from 280° F. to 350° F.

11. A carbon monoxide detector comprising: the end product of a mixed solution of a selected strength of palladium halide and one-fifth said strength of an indicator from the group consisting of sodium alizarin sulfonate and ortho tolidine, as deposited upon an absorbent inorganic carrier that is thereafter dried with low heat and baked for about one-half hour at about 300° F.

12. The method of photoelectrically detecting carbon monoxide contamination comprising: depositing a light colored reactive substance of mixed sensitivity upon the surface of a granular inorganic translucent carrier which substance darkens upon exposure to carbon monoxide; disposing the substance upon a transparent plate; disposing the plate between the light and photoelectric element of a photoelectric measuring circuit; and continuously exposing the plate to the contaminated atmosphere, said substance having a palladium compound that darkens upon exposure to carbon monoxide and also having a copper compound that resists said darkening and which tends to lighten the substance to render the substance self-regenerating and independent of time of exposure, said mixed sensitivities being obtained by differing the relative proportions of palladium and copper in the substance applied to different granules of carrier.

13. A carbon monoxide detector substance formed from materials comprising: one volume of palladium chloride solution; one volume of solution having dissolved therein an indicator from the group consisting of alizarin red S and ortho tolidine of approximately one-fifth of the percentage strength of the palladium chloride; and silica gel of a quantity and mesh size to absorb the two solutions, said silica gel being thereafter dried and then baked at a temperature of about 300° F.

14. A carbon monoxide detector substance formed as follows: absorbing with about 60 mesh silicia gel a solution of 5% palladium chloride and about 1% of one of an indicator of the group consisting of alizarin red S and ortho tolidine; drying the gel with low temperature heat; and baking the gel at a temperature in the range of 280° F. to 350° F. for about half an hour.

15. A tape for use on photoelectric detectors for carbon monoxide comprising a transparent strip and granules of colorimetric detector of mixed sensitivity adhered to one surface, said detector comprising: about one volume of an indicator from the group consisting of sodium alizarin sulfonate and ortho tolidine of approximately one per cent concentration aqueous solution; about one volume of approximately 5% palladium chloride solution; one to four volumes of water; one-tenth to ten volumes of copper chloride aqueous solution of about 5% concentration; silica gel granules sufficient to absorb the mixture of the foregoing, and as dried thereon from 110° F. to 135° F. and thereafter baked about half an hour from 350° F. to 460° F., said detector responding primarily to concentration of carbon monoxide and substantially independently of time of exposure, said granular detectors being non uniform in color response to CO concentration because of varying proportions of copper chloride relative to the palladium chloride, to produce the mixed sensitivity.

16. A tape as described in claim 15 wherein the granules of mixed sensitivity are sorted, to group granules of similar sensitivity which are separately adhered to discrete areas of the strip.

17. A continuous carbon monoxide detector and measurer comprising: a surface having disposed thereon in separate areas several self regenerative detectors of different sensitivity that darken upon exposure to CO substantially independently of time of exposure and primarily to CO concentration, said detectors being the product of aqueous solutions of palladium halide, sodium alizarin sulfonate, guinea green dye and copper chloride deposited from aqueous solution upon the surface of an absorbent inorganic carrier and dried thereon and subsequently baked, said constituents being about 5%, 1%, .02% and 5% in concentration respectively, and volumes approximately one, one, three, and one-tenth to ten respectively, said different sensitivities being obtained by varying the proportions of copper chloride to palladium halide.

References Cited in the file of this patent

UNITED STATES PATENTS

| | | |
|---|---|---|
| 892,241 | Friese | June 30, 1908 |
| 1,512,893 | Fulweiler | Oct. 21, 1924 |
| 1,644,014 | Gordon et al. | Oct. 4, 1927 |
| 1,684,587 | Hultman | Sept. 18, 1928 |
| 1,891,429 | Ljunggren | Dec. 20, 1932 |
| 1,977,002 | Ljunggren | Oct. 16, 1934 |
| 2,153,568 | Johnson | Apr. 11, 1939 |
| 2,345,090 | Brace | Mar. 28, 1944 |
| 2,371,405 | Munn | Mar. 13, 1945 |
| 2,487,077 | Shepherd | Nov. 8, 1949 |
| 2,549,974 | Klug | Apr. 24, 1951 |
| 2,551,281 | Moses et al. | May 1, 1951 |
| 2,552,107 | Miller | May 8, 1951 |
| 2,554,414 | McLendon | May 22, 1951 |
| 2,561,802 | Klug | July 24, 1951 |

FOREIGN PATENTS

| | | |
|---|---|---|
| 248,807 | Great Britain | Mar. 15, 1926 |
| 396,672 | Great Britain | Aug. 10, 1933 |
| 436,906 | Great Britain | Oct. 21, 1935 |
| 578,745 | Great Britain | July 10, 1946 |
| 582,184 | Great Britain | Nov. 7, 1946 |

OTHER REFERENCES

Shepherd: "Ind. and Eng. Chem." Anal. Ed., February 1947, pages 77–81.